(12) United States Patent
Shimada

(10) Patent No.: US 6,532,095 B1
(45) Date of Patent: Mar. 11, 2003

(54) OPTICAL SCANNER

(75) Inventor: Katsumi Shimada, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/634,705

(22) Filed: Aug. 7, 2000

(30) Foreign Application Priority Data

Aug. 6, 1999 (JP) ............................................. 11-223665

(51) Int. Cl.[7] .............................................. G02B 26/08
(52) U.S. Cl. ........................ 359/216; 359/205; 359/217
(58) Field of Search ................................ 359/205–207, 359/216–219; 347/258–261

(56) References Cited

U.S. PATENT DOCUMENTS 4,756,585 A  7/1988  Kaneko et al.
5,963,355 A * 10/1999 Iizuka ........................ 359/205
5,973,813 A * 10/1999 Takeuchi ..................... 359/207
6,078,419 A *  6/2000 Atsuumi ...................... 359/207
6,091,533 A *  7/2000 Iizuka ........................ 359/208

FOREIGN PATENT DOCUMENTS

JP          62-30214      2/1987     ........... G02B/26/10

* cited by examiner

*Primary Examiner*—James Phan
(74) *Attorney, Agent, or Firm*—Sughrue Mion, PLLC

(57) ABSTRACT

Disclosed herein is an optical scanner having a light source, a collimator lens, a first image-forming optics system with a cylindrical lens, and a second image-forming optics system with a rotating polygon mirror and an fθ lens. In the optical scanner, a light beam is incident obliquely on the rotating polygon mirror with respect to both a horizontal scanning direction and a vertical scanning direction. The cylindrical lens is disposed so that its generating line is substantially parallel with a plane perpendicular to the axis of rotation of the rotating polygon mirror.

1 Claim, 4 Drawing Sheets

F I G . 1
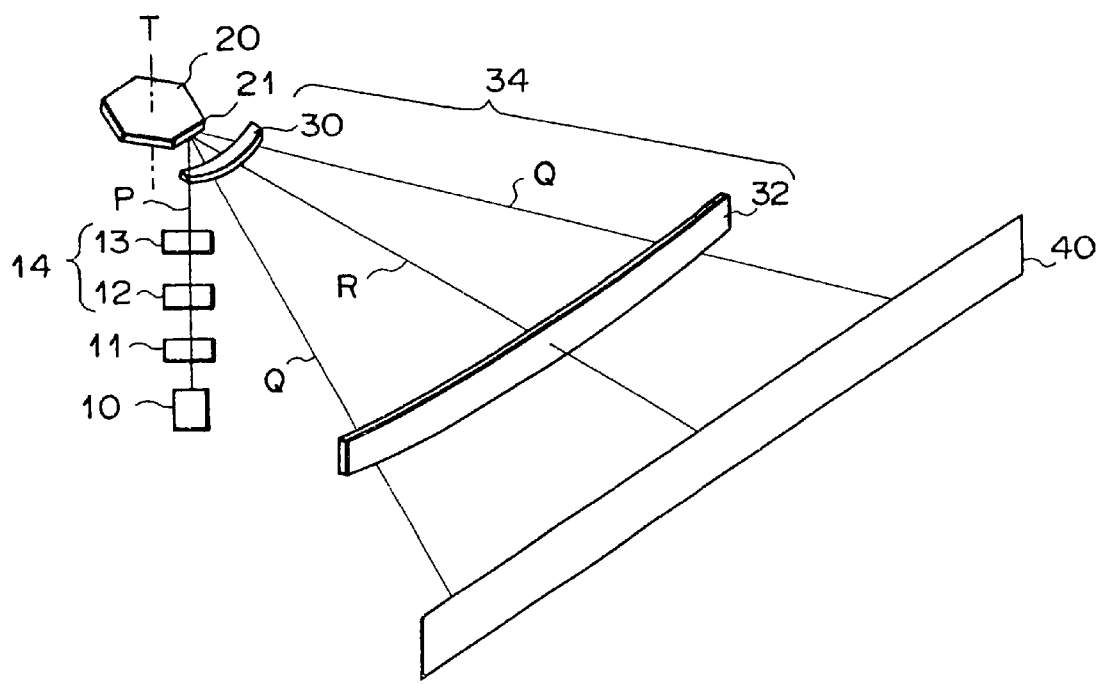

OPTICAL SCANNER

BACKGROUND OF THE INVENTION

1. Field of the Invention

The present invention relates to an optical scanner in which a rotating polygon mirror is used as a deflector, and more particularly to fluctuation in spot shapes on a scan surface.

2. Description of the Related Art

Optical scanners are well known in which optical scanning is performed by a light beam, deflected and reflected by a rotating polygon mirror used as a deflector. This type of optical scanner is utilized in recorders or readers where a laser light, etc., is used as a light source source, such as printers, scanners, radiation image information readers and the like. The optical scanner is generally constructed of a light source for emitting a light beam, a collimator lens for collimating the light beam emitted from the light source, a first image-forming optics system, and a second image-forming optics system. The first image-forming optics system consists of a cylindrical lens, etc., disposed so that the light beam from the collimator lens is formed near the reflection surface (deflection surface) of a rotating polygon mirror as the line image. The second image-forming optics system consists of the rotating polygon mirror for deflecting and reflecting the light beam emitted from the first image-forming optics system, an fθ lens and a cylindrical lens for converging a beam Q, deflected and reflected by the rotating polygon mirror 20, at a predetermined scan surface, and for scanning the beam Q on the scan surface at uniform velocity, and the like.

It is known that such an optical scanner adopts an oblique incidence optics system (e.g., Japanese Unexamined Patent Publication No. 62(1987)-30214). In this optical scanner, when it is assumed that a plane always including a light beam, deflected and reflected by the rotating polygon mirror, is a horizontal scanning plane and that a plane, perpendicular to the horizontal scanning plane, which includes the central axis (optical axis) of the second image-forming optics system, is a vertical scanning plane, a light beam is incident and deflected at an angle to the horizontal scanning plane. In the oblique incidence optics systems, including the one disclosed in the above-mentioned publication, the angle of a light beam incident on the rotating polygon mirror with respect to the vertical scanning plane, i.e., the angle of incidence in the horizontal scanning direction, is normally considered to be 0 degrees.

As described above, in the case where a light beam is caused to be incident on the rotating polygon mirror, with the angle of incidence in the horizontal scanning direction being 0 degrees, there is a need to increase the angle of the light beam incident on the rotating polygon mirror with respect to the horizontal scanning plane (i.e., the angle of incidence in the vertical scanning direction) to a certain degree, to avoid mechanical interference between the first image-forming optics system and the second image-forming optics system. On the other hand, if the angle of incidence in the vertical scanning direction is made larger, there is a problem that the curvature of the scanning line on a scan surface will be increased.

Hence, for example, it is considered that the above-mentioned mechanical interference can be avoided by causing the light beam to be incident on the rotating polygon mirror at an angle to the horizontal scanning direction as well as to the vertical scanning direction, and that the curvature of the scanning line can be suppressed by making the angle of incidence in the vertical scanning direction smaller.

On the other hand, in the above-mentioned optical scanner, the parallelism between the reflection surface of the rotating polygon mirror and the axis of rotation of the rotating polygon mirror normally varies from reflection surface to reflection surface. To prevent the occurrence of scanning-line position fluctuation (pitch fluctuation) in which the position of a scanning line on the scan surface fluctuates in the vertical scanning direction substantially perpendicular to the direction of the scanning line because of the aforementioned variation in the parallelism, the aforementioned two cylindrical lenses are provided on the entrance side and exit side of the rotating polygon mirror and constitute a parallelism correction optics system for correcting for the aforementioned scanning-line position fluctuation (pitch fluctuation).

In the case where the parallelism correction optics system is provided, as described above, the line image of an incident beam is formed on the reflection surface of the rotating polygon mirror. In this case, if a light beam is obliquely incident in the vertical scanning direction with the angle of incidence in the horizontal direction being 0 degrees, the position of a line image on the reflection surface of the rotating polygon mirror fluctuates according to the scanning angle, and the gradient of the line image becomes symmetrical with respect to a scanning angle of 0 degrees. The shape of a spot on the scan surface becomes a nearly true circle at a scanning angle of 0 degrees. When the scanning angle is θ, the spot shapes both become a longitudinally long and small ellipse and also become symmetrical with each other.

On the other hand, if a light beam is obliquely incident not only in the vertical scanning direction but also in the horizontal scanning direction, the gradient of a line image on the reflection surface becomes asymmetrical. Because of this, for example, if the shape of a spot on the scan surface has a nearly true circle at a scanning angle of −θ, it becomes a longitudinally long and large ellipse when the scanning angle is +θ.

SUMMARY OF THE INVENTION

The present invention has been made in view of the above-mentioned drawbacks found in the prior art. Accordingly, it is the primary object of the present invention to provide an optical scanner which is capable of suppressing fluctuation in spot shapes on a scan surface, i.e., maintaining the symmetry of spot shapes, even when an oblique incidence optics system for causing a light beam to be incident at an angle to the horizontal scanning direction as well as to the vertical scanning direction is adopted to suppress the curvature of a scanning line.

To achieve this end, there is provided an optical scanner comprising:

a collimator lens for collimating a light beam emitted from a laser light source;

a rotating polygon mirror for deflecting and reflecting the light beam;

a cylindrical lens disposed so that the light beam from the collimator lens is formed near a reflection surface of the rotating polygon mirror as a line image; and an image-forming optics system for converging the light beam, deflected and reflected by the rotating polygon mirror after having passed through the cylindrical lens, at a predetermined scan surface, and for scanning the converged light beam on the surface at uniform velocity;

the light beam being obliquely incident on the reflection surface with respect to both a first plane perpendicular to an axis of rotation of the rotating polygon mirror and a second plane, perpendicular to the first plane, which includes the central axis of the image-forming optics system;

wherein the cylindrical lens is disposed so that its generating line is substantially parallel with the first plane.

The words "first plane" refer to a plane (deflection plane) that the normal of the reflection surface forms by rotation of the rotating polygon mirror.

In a preferred form of the present invention, when it is assumed that a plane, including both the central axis (z) of the image-forming optics system and an x-axis (x) perpendicular to both the central axis (z) and the axis of rotation of the rotating polygon mirror, before the rotating polygon mirror is inclined, is an x-z plane and that a plane, including both a y-axis (y) perpendicular to the x-z plane and the central axis (z), is a y-z plane, an angle α, which is formed within the x-z plane by both the light beam incident on the reflection surface of the rotating polygon mirror and the central axis (z), an angle β, which is formed by the y-z plane and the light beam incident on the reflection surface, an angle γ, which is formed by the generating line of the cylindrical lens and the x-z plane, an angle φ, which is formed by both the axis of rotation projected on the x-y plane and the central axis (z), and an angle δ, which is formed by the y-axis (y) and the axis of rotation, satisfy the following equation:

$$\gamma=\tan^{-1}\{(\cos\alpha\sin\phi\sin\delta-\sin\alpha\cos\phi\sin\delta)/(\sin\alpha\sin\beta\sin\phi\sin\delta+\cos\beta\cos\delta+\cos\alpha\sin\beta\cos\phi\sin\delta)\} \quad (1)$$

According to the optical scanner of the present invention, the cylindrical lens is disposed so that its generating line is substantially parallel with the first plane perpendicular to the axis of rotation of the rotating polygon mirror. As a result, the gradient of a line image formed on the reflection surface of the rotating polygon mirror becomes approximately symmetrical with a scanning angle of 0 degrees as reference, and fluctuation in spot shapes on a scan surface can be suppressed.

In addition, if an angle γ which is formed by both the generating line of the cylindrical lens and the x-z plane is set to an angle prescribed by the above-mentioned Eq. (1), the generating line of the cylindrical lens can be made substantially parallel with the first plane perpendicular to the axis of rotation of the rotating polygon mirror.

BRIEF DESCRIPTION OF THE DRAWINGS

The present invention will be described in further detail with reference to the accompanying drawings wherein:

FIG. 1 is a perspective view showing an optical scanner constructed in accordance with an embodiment of the present invention;

DESCRIPTION OF THE PREFERRED EMBODIMENT

Figure 2A:
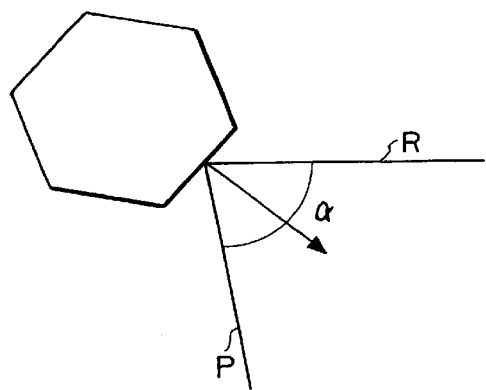
FIG. 2A is an optical path diagram showing how an incident beam is reflected within an x-z plane corresponding to a horizontal scanning plane.
Figure 2A:
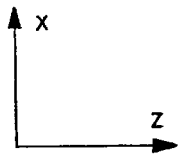

Referring to FIG. 1, there is shown an optical scanner in accordance with an embodiment of the present invention. The optical scanner comprises a light source (laser light source) 10 for emitting a light beam P, a collimator lens 11 for collimating the light beam P emitted from this light source 10, a first image-forming optics system 14, and a second image-forming optics system 34. The first image-forming optics system 14 consists of a cylindrical lens 12 and a prism 13, which are disposed so that the light beam P from the collimator lens 11 is formed near the reflection surface (deflection surface) of a rotating polygon mirror 20 as the line image. The second image-forming optics system 34 consists of the rotating polygon mirror 20 for deflecting and reflecting the light beam emitted from the first image-forming optics system 14 (hereinafter referred to as an incident beam P), and an fθ lens 30 and a concave cylindrical lens 32 for converging a beam Q, deflected and reflected by the rotating polygon mirror 20, at a predetermined scan surface, and for scanning the beam Q on the scan surface at uniform velocity.

The incident beam P emitted from the light source 10 is converged in line form and incident on the reflection surface 21 of the rotating polygon mirror 20 via the collimator lens 11, the cylindrical lens 12, and the prism 13.

The rotating polygon mirror 20 is hexagonal in cross section and has 6 (six) reflection surfaces 21. With rotation of the mirror 20 on its axis of rotation (T), the beam Q reflected at the reflection surface 21 is transmitted through the fθ lens 30 and the concave cylindrical lens 32 and incident on a scan body 40, whereby scanning exposure is performed.

The fθ lens 30 is used for converging the beam Q reflected by the rotating polygon mirror 20, at the scan surface of the scan body 40. With this fθ lens 30, uniform movement of the light beam on the scan surface in the horizontal scanning direction is made possible.

The cylindrical lens 12, the prism 13, and the concave cylindrical lens 32 constitute a parallelism correction optics system. With this correction optics system, a correction for a variation in parallelism with respect to the scan surface due to each reflection surface 21 of the rotating polygon mirror 20 is made so that the reflected beam Q can perform vertical scanning at constant pitches. Note that the fθ lens 30 and the parallelism correction optics system may use, as appropriate, lenses well known in the art other than that shown in FIG. 1.

In the optical scanner of the aforementioned construction, incidentally, the cylindrical lens 12 is disposed so that the generating line of the cylindrical lens 12 becomes parallel with a deflection surface (first flat surface in the present invention) perpendicular to the rotation axis T of the rotating polygon mirror 20. Therefore, the inclination of a line image to be formed on the reflection surface 21 of the rotating polygon mirror 20 becomes substantially symmetrical with a scanning angle of 0 degrees as reference. With this arrangement, fluctuation in spot shapes on the scan surface can be suppressed. This will hereinafter be described in detail.

First, consider an orthogonal coordinate system (x-y-z), which has the central axis (optical axis) R of the second image-forming optics system 34 as a z-axis and also has an x-axis perpendicular to both the z-axis and the rotation axis T of the rotating polygon mirror 20 and has a y-axis perpendicular to an x-z plane including both the x-axis and the z-axis (central axis R). Then, consider an oblique incidence optics system in which: the x-z plane is set parallel to an optical board surface; the rotating polygon mirror 20 is inclined relative to the x-z plane (optical board surface), as shown in FIG. 2B; and the light beam that is incident on the rotating polygon mirror 20 is inclined in both horizontal and vertical scanning directions so that the central axis R of the second image-forming optics system 34 is held parallel with respect to the surface of the optical base-board. Note that the direction, which is orthogonal to the rotation axis T of the rotating polygon mirror 20 and perpendicular to the central axis R of the second image-forming optics system, is referred to as the horizontal scanning direction and that the direction, which is perpendicular to the central axis R, within a plane including the rotation axis T of the rotating polygon mirror, is referred to as the vertical scanning direction.

Figure 2B:
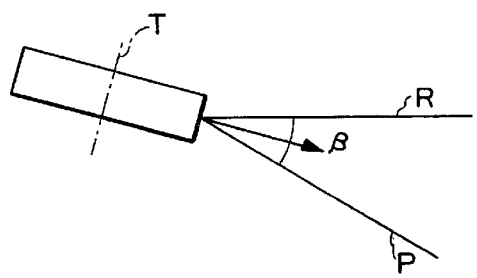
FIG. 2B is an optical path diagram showing how an incident beam is reflected within a y-z plane corresponding to a vertical scanning plane.
Figure 2B:
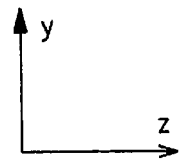

FIG. 2A illustrates an optical path within the x-z plane corresponding to the horizontal scanning plane. FIG. 2B illustrates an optical path within the y-z plane corresponding to the vertical scanning plane. The reason that "corresponding to the horizontal scanning plane" and "corresponding to the vertical scanning plane" are stated is that while a plane always including the beam Q reflected by the rotating polygon mirror 20 is referred to as a horizontal scanning plane and a plane perpendicular to the horizontal scanning plane, including the central axis R of the second image-forming optics system 34, is referred to as a vertical scanning plane, the horizontal scanning plane does not become a plane in the oblique incidence optics system inclined not only in the vertical direction but also in the horizontal direction.

The angle $\alpha$ in FIG. 2A refers to an angle that both the beam P incident on the reflection surface 21 of the rotating polygon mirror 20 and the central axis R of the second image-forming optics system 34 (i.e., the z-axis) form within the x-z plane, i.e., an angle that both the incident beam P, projected on the x-z plane, and the central axis R form. The angle $\beta$ in FIG. 2B means an angle that the y-z plane and the incident beam P form, i.e., an angle that both the incident beam P, projected on the y-z plane, and the central axis R form.

Figure 3A:
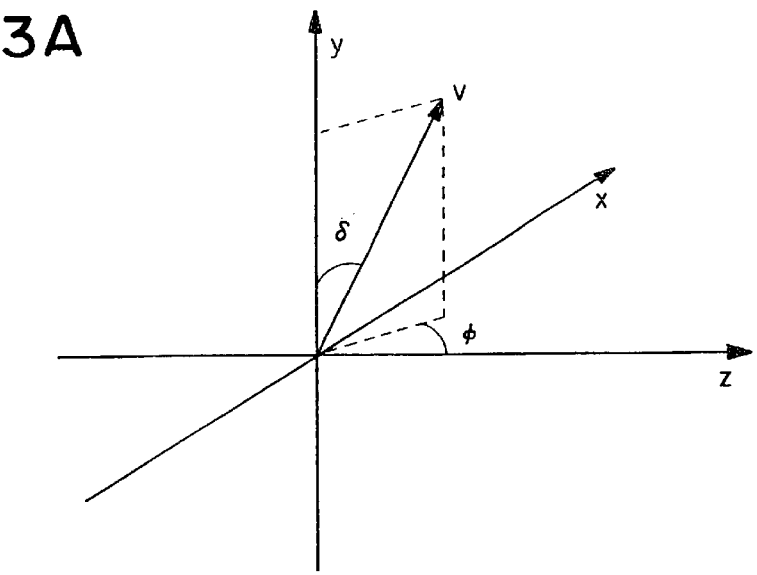
FIG. 3A is a diagram showing the inclination of the rotating polygon mirror of FIG. 1 in terms of an x-y-z coordinate system.

Next, consider the case where the rotating polygon mirror 20 is inclined relative to the x-z plane. As shown in FIG. 3A, assume that $\phi$ indicates an azimuth angle that both the projected line of the rotation axis T of the rotating polygon mirror 20 onto the x-z plane and the central axis R of the second image-forming optics system 34 form. Also, assume that $\delta$ represents an inclined angle which both a normal to the x-z plane (i.e., y-axis) and the rotation axis T of the rotating polygon mirror 20 form. Furthermore, v is assumed to be a unit vector along the rotation axis T of the rotating polygon mirror 20. With this assumption, the components vx, vy, and vz of the unit vector v are represented as follows:

$vx = \sin \phi \sin \delta$ $vy = \cos \delta$ $vz = \cos \phi \sin \delta$

The unit vector v is perpendicular to the deflection plane which the normal of the reflection surface 21 of the rotating polygon mirror 20 forms by rotation of the rotating polygon mirror 20, i.e., the plane perpendicular to the rotation axis T of the rotating polygon mirror 20.

Next, consider an orthogonal coordinate system (u-v-w) having a v-axis along the unit vector v, with the aforementioned deflection plane as a u-w plane.

Figure 3B:
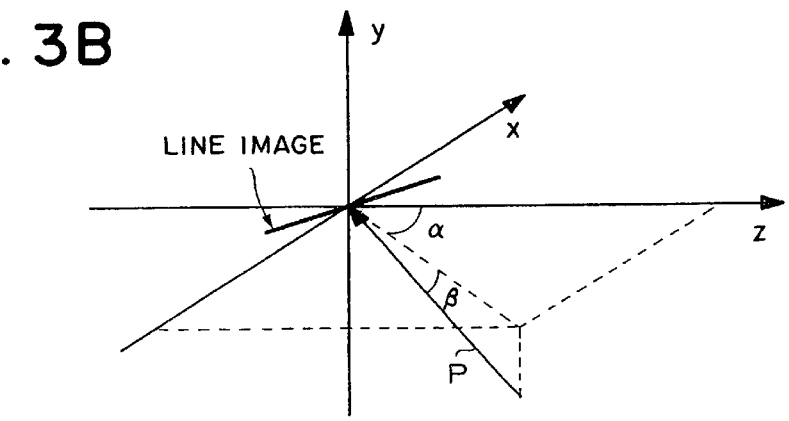
FIG. 3B is a diagram showing the angular relationship of an incident beam.

Assuming the base vectors of the orthogonal coordinate system in the x-y-z space are i, j, and k and that the base vectors of the orthogonal coordinate system in the u-w-v space are u, v, and w, the base vectors are related from the relationship shown in FIG. 3A by the following equations:

$i = (\cos \phi)u + (\sin \phi \sin \delta)v + (\sin \phi \cos \delta)w$ $j = (\cos \delta)v - (\sin \delta)w$ $k = (-\sin \phi)u + (\cos \phi \sin \delta)v + (\cos \phi \cos \delta)w$ The angular relationship of the incident beam P is shown in FIG. 3B.

Since the cylindrical lens 12 is normally attached so that its generating line becomes parallel to the aforementioned base surface (x-z plane), a line image that is formed on the reflection surface 21 of the rotating polygon mirror 20 by the cylindrical lens 12 also becomes parallel to the x-z plane, as shown in FIG. 3B.

The line image is always parallel with the generating line of the cylindrical lens 12, so the line image can be rotated by rotating the cylindrical lens 12 with respect to the x-z plane. This rotation will hereinafter be referred to as in-plane rotation.

Figure 3C:
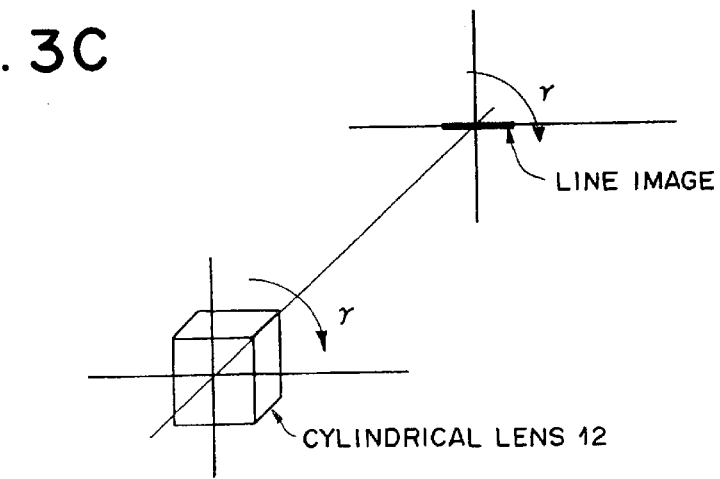
FIG. 3C is a diagram showing the position of a line image formed by the cylindrical lens shown in FIG. 1.

As illustrated in FIG. 3C, when in-plane rotation is performed so that the generating line of the cylindrical lens 12 forms an angle $\gamma$ with the x-z plane, the direction vector of the line image is calculated.

The line image is always within a plane perpendicular to the central axis passing through the cylindrical lens 12, independently of the in-plane rotation of the cylindrical lens 12. Assuming a unit vector along the incident beam P is N, the vector components are given as follows:

$Nx = \sin \alpha \sin \beta$ $Ny = -\sin \beta$ $Nz = \cos \alpha \cos \beta$

The line image is always perpendicular to the unit vector N. Furthermore, the line image is assumed to pass through the origin of the coordinate system, for simplicity. Assuming a unit vector along the line image is A and that the angle of the in-plane rotation of the cylindrical lens 12 is $\gamma$, the vector components are obtained as follows:

$Ax = \sin \alpha \sin \beta \sin \gamma + \cos \alpha \cos \gamma$ $Ay = \cos \beta \sin \gamma$ $Az = \cos \alpha \sin \beta \sin \gamma - \sin \alpha \cos \gamma$ Therefore, the unit vector A is represented by the following equation:

$$A = Axi + Ayj + Azk$$
$$= (\sin\alpha\sin\beta\sin\gamma + \cos\alpha\cos\gamma)i +$$
$$(\cos\beta\sin\gamma)j +$$
$$(\cos\alpha\sin\beta\sin\gamma - \sin\alpha\cos\gamma)k$$

Expressing the unit vector A in terms of the orthogonal coordinate system of the u-w-v space gives $$A = Axi + Ayj + Azk$$
$$= Ax\{(\cos\phi)u + (\sin\phi\sin\delta)v + (\sin\phi\cos\delta)w\} +$$
$$Ay\{(\cos\delta)v - (\sin\delta)w\} +$$
$$Az\{(-\sin\phi)u + (\cos\phi\sin\delta)v + (\cos\phi\cos\delta)w\}$$
$$= (Ax\cos\phi - Az\sin\phi)u +$$
$$(Ax\sin\phi\sin\delta + Ay\cos\delta + Az\cos\phi\sin\delta)v +$$
$$(Ax\sin\phi\cos\delta - Ay\sin\delta + Az\cos\phi\cos\delta)w$$
$$= Auu + Avv + Aww$$

where $Au = Ax \cos\phi - Az \sin\phi$ $Av = Ax \sin\phi \sin\delta + Ay \cos\delta + Az \cos\phi \sin\delta$ $Aw = Ax \sin\phi \cos\delta - Ay \sin\delta + Az \cos\phi \cos\delta$ In order to suppress fluctuation in spot shapes on the scan surface (i.e., maintain the symmetry of the spot shape), there is a need to maintain the symmetry of the gradient of the line image on the reflection surface 21. For this reason, the generating line of the cylindrical lens 12 needs to be substantially parallel with the deflection plane that the normal of the reflection surface 21 forms by rotation of the rotating polygon mirror 20. More specifically, the angle θ that is formed by both the u-w plane and the line image needs to be zero, because the deflection plane is the u-w plane. The condition of the in-plane rotation angle γ of the cylindrical lens 12 that the angle θ becomes zero will hereinafter be calculated.

Figure 4:
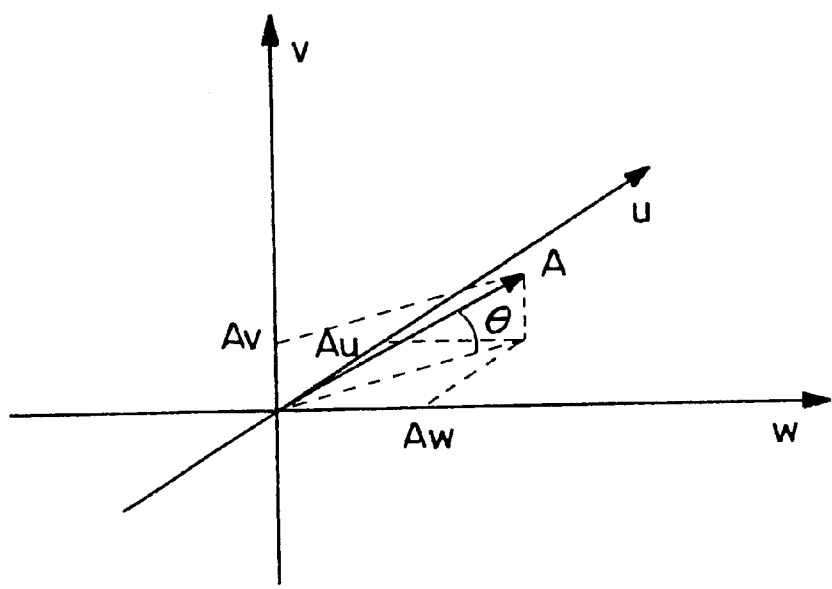
FIG. 4 is a diagram showing the relationship between the plane of rotation of the rotating polygon mirror and the line image.

FIG. 4 illustrates the relationship between the plane of rotation of the rotating polygon mirror 20 and the line image. From this figure it follows that the condition of θ=0 is Av=0. That is, $$Av = Ax\sin\phi\sin\delta + Ay\cos\delta + Az\cos\phi\sin\delta$$
$$= (\sin\alpha\sin\beta\sin\gamma + \cos\alpha\cos\gamma)\sin\phi\sin\delta +$$
$$(\cos\beta\sin\gamma)\cos\delta +$$
$$(\cos\alpha\sin\beta\sin\gamma - \sin\alpha\cos\gamma)\cos\phi\sin\delta$$
$$= (\sin\alpha\sin\beta\sin\phi\sin\delta + \cos\beta\cos\delta + \cos\alpha\sin\beta\cos\phi\sin\delta)\sin\gamma +$$
$$(\cos\alpha\sin\phi\sin\delta - \sin\alpha\cos\phi\sin\delta)\cos\gamma$$
$$= 0$$

Dividing both sides of the above equation by cos γ gives (sin α sin β sin φ sin δ+cos β cos δ+cos α sin β cos φ sin δ)tan γ=(cos α sin φ sin δ−sin α cos φ sin δ)

That is, the condition equation for angle γ that θ becomes 0 is expressed as:

γ=tan$^{-1}$\{(cos α sin φ sin δ−sin α cos φ sin δ)/(sin α sin β sin φ sin δ+cos β cos δ+cos α sin β cos φ sin δ)\}  (1)

Substituting α=74.0 degrees, β=2.0 degrees, φ=0 degree, and δ=1.5675 degrees into Eq. (1) yields γ=1.5 degrees Thus, the angle θ which is formed by both the u-w plane and the line image can be made zero, by performing the in-plane rotation of the cylindrical lens 12 so that its generating line forms the angle γ prescribed by both the x-z plane and the aforementioned equation. In other words, the generating line of the cylindrical lens 12 can be made substantially parallel with respect to the aforementioned deflection surface, by arranging the components of the optics system so that (1) the angle α formed by both the beam P incident on the reflection surface 21, projected on the x-z plane, and the z-axis, (2) the angle β formed by the y-z plane and the beam P incident on the reflection surface 21, (3) the angle γ formed by both the generating line of the cylindrical lens 12 and the x-z plane, (4) the angle φ formed by both the rotation axis T of the rotating polygon mirror 20, projected on the x-z plane, and the z-axis, and (5) the angle δ formed by both the y-axis and the rotation axis T of the rotating polygon mirror 20 to satisfy the aforementioned condition of Eq. (1). Therefore, spots formed on the scan surface can be made uniform regardless of a scanning position (scanning angle), and fluctuation in spot shapes can be suppressed.

Next, a description will be given of the comparison of the embodiment of the optical scanner of the present invention and a conventional optical scanner. Table 1 shows the relationship between the beam diameter and the scanning position in the embodiment of the optical scanner of the present invention. Table 2 shows the relationship between the beam diameter and the scanning position in the conventional optical scanner.

By applying the present invention, from the aforementioned comparison it is found that the size of the beam diameter in the vertical scanning direction has been improved particularly at the center and the end of the scanning operation.

Therefore, in the optical scanner adopting the oblique incidence optics system, in which a light beam is incident at predetermined angles in both the horizontal scanning direction and the vertical scanning direction, fluctuation in spot shapes on a scan surface can be suppressed by disposing the cylindrical lens so that the generating line of the cylindrical lens becomes parallel with a plane perpendicular to the axis of rotation of the rotating polygon mirror.

The foregoing description has been made of the oblique incidence optics system, in which the rotating polygon mirror 20 is inclined with respect to the x-z plane (optical board surface) and also the incident beam to the rotating polygon mirror 20 is inclined in both the horizontal and vertical scanning directions so that the central axis R of the second image-forming optics system 34 is held parallel with respect to the optical board surface. However, the present invention is not limited to the oblique incidence optics system, because the expression "is inclined" is a relative concept. For example, the invention may adopt another oblique incidence optics system, in which the second image-forming optics system 34 is inclined with respect to the base surface (x-z plane) and also an incident beam is inclined in both the horizontal and vertical scanning directions so that the deflection surface (or the first plane of the present invention) that the normal of the reflection surface 21 forms by rotation of the rotating polygon mirror 20 is held parallel with respect to the optical board surface (x-z plane).

Although the present invention has been described with a certain degree of particularity, it is understood that the present disclosure has been made only by way of example and that numerous changes in the details of the construction and the combination and arrangement of the parts may be made without departing from the scope of the invention hereinafter claimed.

In addition, all of the contents of the Japanese Patent Application No. 11(1999)-223665 are incorporated into this specification by reference.

TABLE 1

WITH ADJUSTMENTS TO THE ROTATION OF THE CYLINDRICAL LENS ANGLE OF ROTATION 1.5 deg

| BEAM DIAMETER SCANNING POSITION | HORIZONTAL SCANNING | VERTICAL SCANNING |
|---|---|---|
| END | 102.8 | 109.0 |
| CENTER | 82.0 | 90.6 |
| LIGHT SOURCE SIDE | 100.8 | 108.8 |

TABLE 2

WITHOUT ADJUSTMENTS TO THE ROTATION OF THE CYLINDRICAL LENS

| BEAM DIAMETER SCANNING POSITION | HORIZONTAL SCANNING | VERTICAL SCANNING |
|---|---|---|
| END | 149.6 | 160.5 |
| CENTER | 102.6 | 117.3 |
| LIGHT SOURCE SIDE | 80.4 | 88.8 |

What is claimed is:

1. An optical scanner, comprising:

a collimator lens for collimating a light beam emitted from a laser light source;

a rotating polygon mirror for deflecting and reflecting said light beam;

a cylindrical lens disposed so that said light beam from said collimator lens is formed near a reflection surface of said rotating polygon mirror as a line image; and an image-forming optics system for converging said light beam, deflected and reflected by said rotating polygon mirror after having passed through said cylindrical lens, at a predetermined scan surface, and for scanning said converged light beam on said surface at uniform velocity;

said light beam being obliquely incident on said reflection surface with respect to both a first plane perpendicular to an axis of rotation of said rotating polygon mirror and a second plane, perpendicular to said first plane, which includes the central axis of said image-forming optics system;

wherein said cylindrical lens is disposed so that its generating line is substantially parallel with said first plane, and wherein, when it is assumed that a plane, including both said central axis and an x-axis perpendicular to both said central axis and said axis of rotation, before the rotating polygon mirror is inclined, is an x-z plane and that a plane, including both a y-axis perpendicular to said x-z plane and said central axis, is a y-z plane, an angle α, which is formed within said x-z plane by both said light beam incident on said reflection surface and said central axis, an angle β, which is formed by said y-z plane and said light beam incident on said reflection surface, an angle γ, which is formed by the generating line of said cylindrical lens and said x-z plane, an angle φ, which is formed by both said axis of rotation projected on said x-y plane and said central axis, and an angle δ, which is formed by said y-axis and said axis of rotation, satisfy the following equation:

$$\gamma = \tan^{-1}\{(\cos\alpha \sin\phi \sin\delta - \sin\alpha \cos\phi \sin\delta)/(\sin\alpha \sin\beta \sin\phi \sin\delta + \cos\beta \cos\delta + \cos\alpha \sin\beta \cos\phi \sin\delta)\}.$$

* * * * *